United States Patent Office 3,435,691
Patented Apr. 1, 1969

3,435,691
MEANS FOR ACTUATING A FRICTION PAD
IN A DISC BRAKE
Donald J. Cock and Gordon A. Habgood, Tyseley, Birmingham, England, assignors to Girling Limited
Filed June 10, 1966, Ser. No. 556,658
Claims priority, application Great Britain, June 11, 1965, 24,883/65
Int. Cl. F16h 21/44
U.S. Cl. 74—107                              5 Claims

ABSTRACT OF THE DISCLOSURE

A force transmitting rotary bearing arrangement useful for but not limited to brakes comprising a rotary shaft, adapted to act as a cam, supported in a housing with the interposition of a cage, wherein the housing and cage have registering apertures to receive a push rod engageable at one end with the cam, and a number of roller bearings are arranged in a group opposite the push-rod to support the shaft against the reaction of the push-rod.

---

This invention relates to a brake actuating mechanism for brakes of the kind in which a friction pad is applied to a brake rotor, such as a drum or disc by an actuating member which may be actuated by hydraulic or mechanical means or both. The invention includes improvements in and modifications of the mechanism described and claimed in our copending British patent application No. 6,380/63 (Ser. No. 1,029,945—U.S. Patent No. 3,236,336), but features of the invention are applicable to other brake actuating mechanisms of the kind first mentioned.

In the arrangement described in the above mentioned application, a rotatable cam member is subjected in use to a bending moment as well as transmitting torsion, and one object of the present invention is to eliminate such bending moments.

According to one of its features, the invention provides means for applying a friction pad to a brake rotor, including a rotatable cam member arranged to apply a force to a brake actuating member upon rotation of the cam member, means for rotating the cam member, and rotatable bearing members arranged to support a portion of the member aligned with the said brake actuating member against radial thrust.

According to another feature of the invention, there is provided means for applying a friction pad to a brake rotor, including a rotatable cam member engaging a push-rod for transmitting a thrust to a brake actuating member, the said push-rod being mounted in a bore of larger cross-section than the push-rod, so that during rotation of the cam member the push-rod can move transversely of the bore to maintain rolling engagement between the push-rod and the cam member. With this arrangement the efficiency and useful life of the mechanism are both improved by the elimination of sliding friction between the lever and push-rod when these parts are under load.

In similar manner, the invention also eliminates sliding friction between an actuating piston and a brake actuating member, by providing means for applying a friction pad to a brake rotor, including a cylinder, to one end of which pressurised fluid can be supplied, a piston in the cylinder extending out of the other end thereof into engagement with a brake actuating member, the piston being articulated in the cylinder in order that it may maintain rolling engagement with the actuating member during actuation of the piston, and guiding means for the portion of the piston projecting from the cylinder, the guiding means being secured to the cylinder and being adapted to yield resiliently to accommodate articulating movement of the piston.

According to a further feature, the invention provides means for applying a friction pad to a brake rotor, including a rigid rocking lever movable by an actuating force about a fulcrum, first and second thrust members in screw-threaded engagement with each other for transmitting forces from the lever to the friction pad, pawl and ratchet means acting between the lever and one of the said thrust members to compensate for wear of the friction pad by effecting relative rotation of the first and second thrust members, first biasing means for biasing the lever towards an inoperative position, and second biasing means for biasing the said thrust members towards a first position from which the thrust members are movable in a direction transverse to the line of action of the lever on the thrust members, the first biasing means interacting with the second biasing means to assist in biasing the thrust members and also in biasing the pawl towards the ratchet. This arrangement results in more efficient use of resilient biasing members than if separate members had been employed for the several functions indicated.

One form of brake actuating means (and a modification thereof) in accordance with the invention will now be described, by way of example only, with reference to the accompanying drawings, in which.

Figure 1:
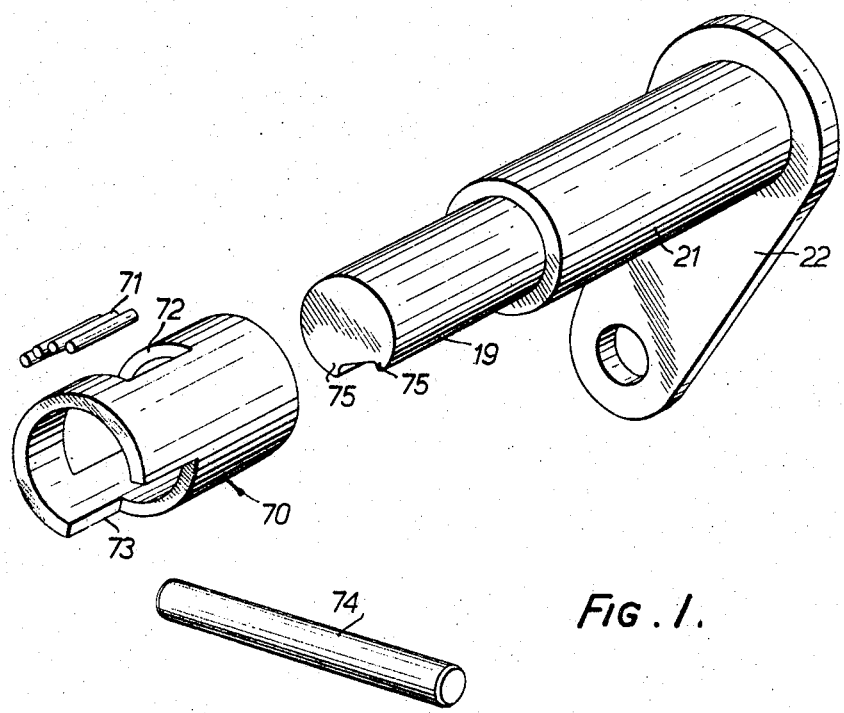
FIGURE 1 is an exploded view of a hand-brake mechanism in accordance with the invention.

It will be apparent from the drawings that the embodiments of the present invention are similar in construction to the brake-actuating mechanism or parts thereof disclosed in our above application; it is therefore deemed sufficient to describe in detail in the particular description only the modifications to the mechanisms of our above mentioned earlier application. To aid in the understanding of the description, like parts disclosed in the above and present applications are given the same reference numerals.

Referring to FIGURE 1, the hand brake mechanism, like that of our earlier application, includes a cam 19 on a shaft 21 carrying an arm 22 adapted to be connected to a hand brake lever. However, in this embodiment, the cam is mounted in an angularly rotatable roller carrier 70 disposed in a cylindrical recess in caliper 12 and carrying roller bearings 71 located in a cut-out 72; carrier 70 has a further cut-out 73 which accommodates a push rod 74 disposed transversely to the cam 19 and generally parallel to piston rod 16, the push-rod cooperating with projections 75 formed on cam 19 and with the rocking lever 13.

Figure 2:
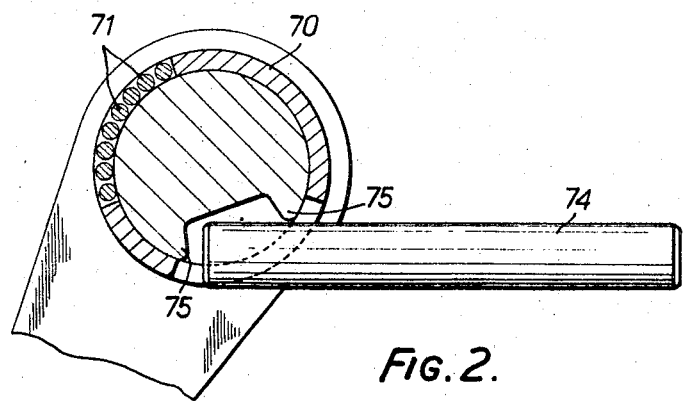
FIGURE 2 is a transverse section of the assembled hand brake mechanism.

With this arrangement, the roller bearings 71, which are aligned with the push rod, support the cam 19 against radial thrust during operation of the handbrake whereby friction, and hence the elastic deformation of the cam shaft 21, is reduced, and also provide a relatively simple, rigid and efficient bearing for the cam shaft. Further, the push rod angularly locates the carrier 70 and affords a positive stop for return (clockwise) movement of the cam (see FIGURE 2).

Figure 3A:
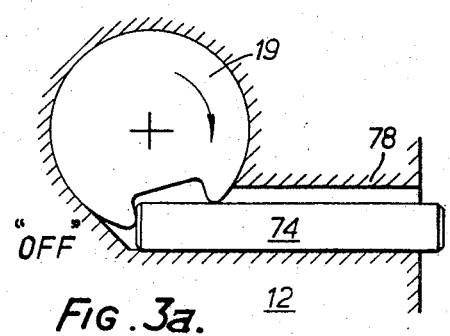
FIGURES 3a and 3b show respectively "off" and "on" positions of the cam and push-rod of the mechanism.
Figure 3B:
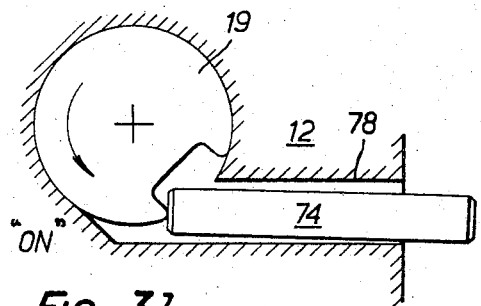
Figure 6:
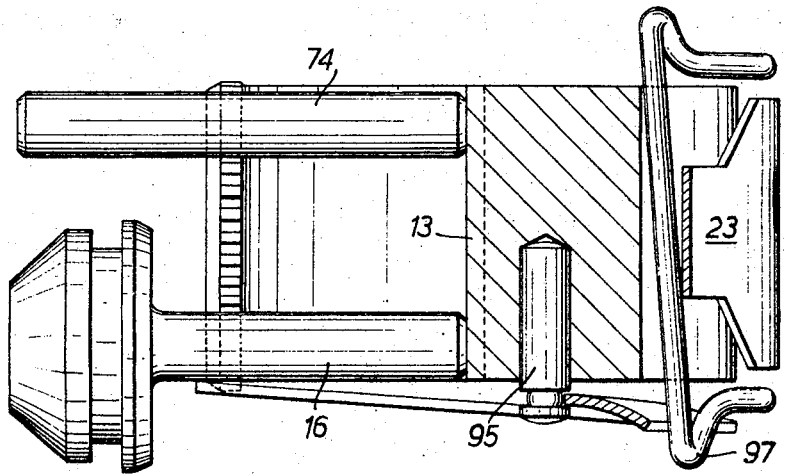
FIGURE 6 is a section taken along the line B—B in FIGURE 4.
Figure 4:
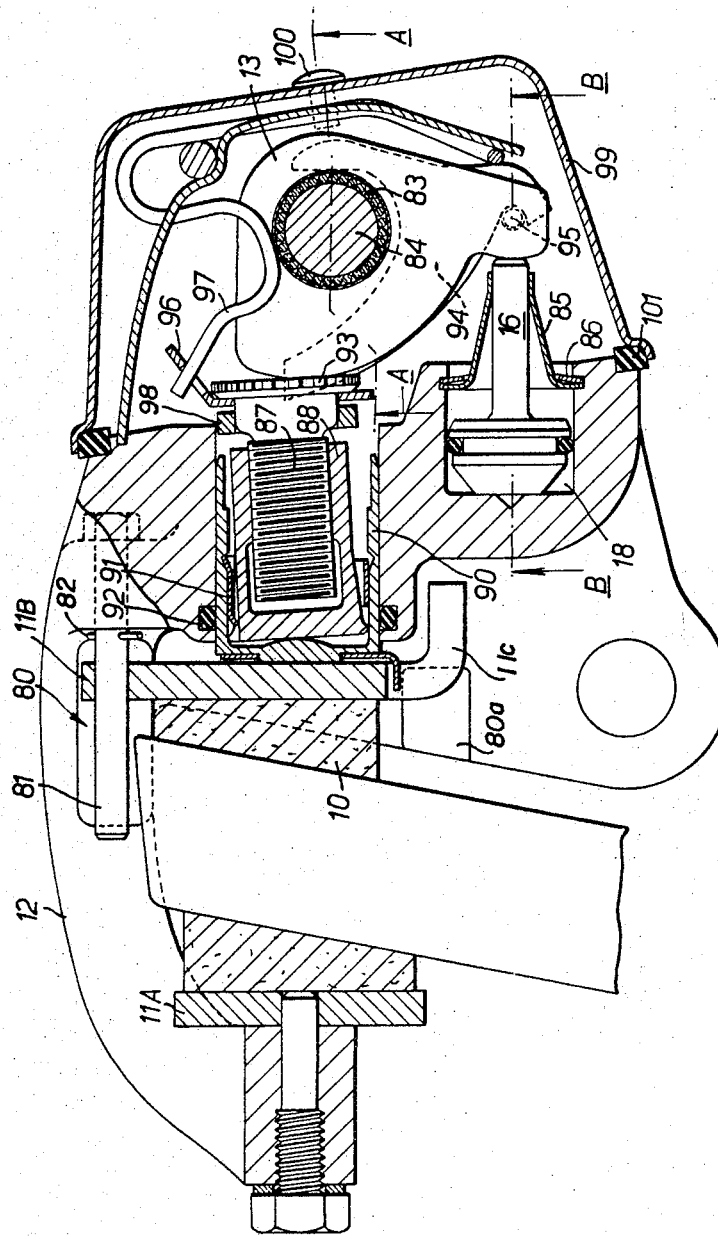
FIGURE 4 is a sketch showing a plan view, partly in section, of a brake actuating mechanism in accordance with the invention, and for a disc brake.
Figure 5:
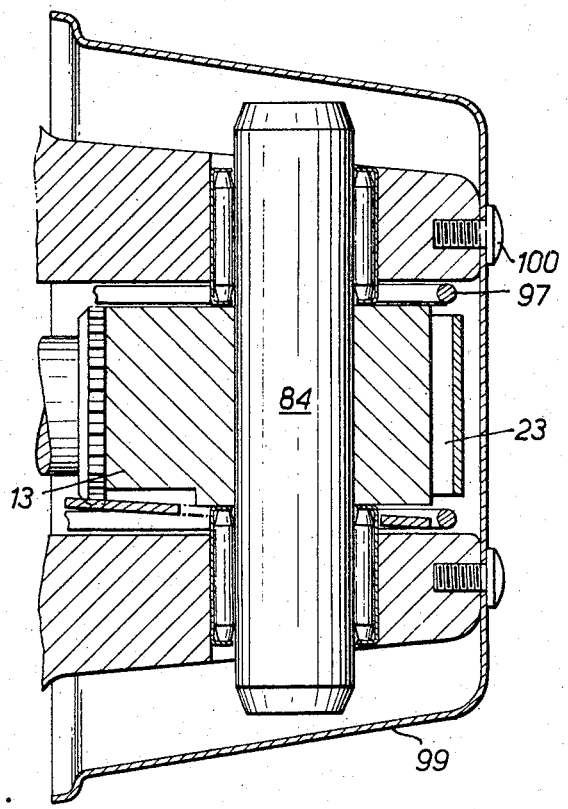
FIGURE 5 is a section taken along the line A—A in FIGURE 4.
Figure 7:
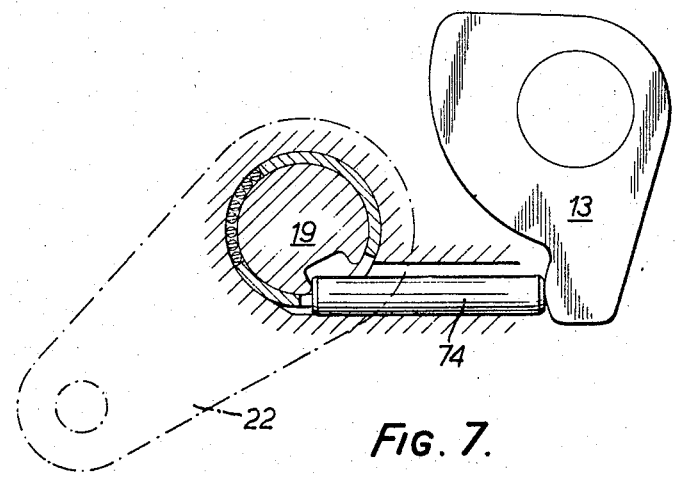
FIGURE 7 is a section showing the hand brake mechanism which is disposed parallel with the hydraulic-actuating mechanism shown in FIGURE 4.

Referring to FIGURES 3A and 3B, which are diagrammatic and omit unit bearing members 71 and cage 70. The push rod 74 is mounted in a bore 78 in the caliper 12 and of cross sectional dimensions larger than those of the rod so that the rod can tilt, transversely of the bore, during angular rotation of the cam 19, to maintain rolling engagement between the rod and cam; also the rod engages the lever 13 so that in the latter stages of braking the rod lifts clear of the bore to ensure that there is no friction between the rod and its bore.

Referring to FIGURES 4 to 7, the actuating mechanism is arranged to apply to a rotatable disc friction pads 10 mounted on rigid backing plates 11a, 11b the inner plate 11b being guided for movement towards and away from the disc by two pairs of guiding surfaces 80, 80a formed on caliper 12 and disposed on opposite sides of the plate. Conveniently, to prevent movement of plate 11b radially of the disc, there is provided a pin 81 retained on caliper 12 by a clip 82 and passing through a hole in the plate; plate 11b is also provided with an extension 11c to ensure that the plate remains in guiding engagement with surfaces 80a when the plate is spaced from the caliper due to pad wear. A rigid cam lever 13 is mounted in the caliper for angular movement preferably, by means of needle bearings 83 and shaft 84. Engaging one end of the lever 13 is piston rod 16 articulated in a cylinder 18, to one end of which pressurised fluid is supplied to actuate the brake by moving the piston outwardly (to the right). The outer part of the piston is surrounded by a guiding member 85 in sliding engagement with the piston rod and also secured to the cylinder, for example by means of a bowed circlip 86 whose resilience accommodates articulation of the piston, so that the piston can maintain true rolling engagement with the lever during brake actuation. The provision of resilient means, such as the circlip, also ensures the presence of a restoring force to return the piston to its illustrated position when the actuating pressure is released. The same end of the lever is also engaged by push-rod 74, previously described with reference to FIGURES 1 and 2, which cooperates with cam 19 on a shaft 21 carrying an arm 22 adapted to be connected to a hand lever for applying the brake mechanically. The piston and push-rod both move the lever 13 in the same direction against the bias of a spring 23 secured at one end to the caliper 12.

To compensate for wear of the friction pad the cam surface of lever 13 engages a flat outer face of a member 87 in screw threaded engagement with a load nut 88, members 87 and 88 forming a thrust member of adjustable length between the lever 13 and the friction pad. The thrust member is mounted in, and rockable on a boss formed in a cup shaped member 90 and retained therein by a load nut spring 91. To exclude dirt and water from the inner parts of the mechanism, member 90 is slidably mounted by ring 92 in a cylindrical recess in caliper 12. The outer end of member 87 is formed with a ring of ratchet teeth 93 co-operating with a yoke shaped pawl 94 located on a pawl pin 95 to the lever 13. In the "off" positon of the mechanism the thrust member is inclined at an acute angle to the longitudinal axis of member 90. It is biased to this position preferably by means of a collar 96 carried by member 87 and a collar spring 97 engaging at one end in an aperture in the collar and at the other end between spring 23 and pawl 94; surrounding member 87 is an abutment ring 98. With this arrangement spring 23 is ideally suited for storing energy and it largely provides the energy store for both the lever 13, the thrust member and the pawl (see FIGURE 6). In other words, the collar spring 97 does not need to be capable of storing energy and may be regarded merely as a lever. The springs 23 and 97 may thus be regarded as first and second biasing means which interact in biasing the thrust members 87 and 88 and also in biasing the pawl 94 towards the ratchet teeth 93.

The action of the pad-wear compensating means is substantially the same as that described with reference to the compensating means described in our earlier application and therefore will not be further described.

The inner parts of the mechanism are enclosed by a cover 99 secured to the caliper by screws 100 and sealed by sealing ring 101.

We claim:
1. Means for applying a friction pad to a brake rotor, including a cylinder, to one end of which pressurised fluid can be supplied, a piston in the cylinder, a projection on the piston, a brake actuating member engageable by said projection, the piston being articulated in the cylinder in order that it may maintain rolling engagement with the actuating member during actuation of the piston, and guiding means for the projection on the piston, the guiding means being mounted on the cylinder and being adapted to yield resiliently to accommodate articulating movement of the piston.

2. A force transmitting assembly comprising a housing including a side wall having an opening therethrough, a cylindrical bearing cage in said housing and having an opening in the side wall thereof registering with the opening in the side wall of said housing, a rotatable shaft extending into said housing and coaxially received in said bearing cage, a plurality of rollers grouped together between said housing and said shaft in a selected position circumferentially spaced with respect to said openings, and means carried by said cage for retaining said rollers in their selected position, said shaft being constructed and arranged for operative engagement with a forced transmitting member extending through said registering openings.

3. Means for applying a friction pad to a brake rotor, including a rotatable cam member, a push-rod engaged by said cam member for transmitting a thrust to a brake actuating member, means defining a guide bore of larger cross-section than said push-rod, said push-rod being mounted in said bore, so that during rotation of the cam member the push-rod can move transversely of the bore to maintain rolling engagement between the push-rod and the cam member.

4. The force transmitting assembly of claim 2, in combination with a brake actuating mechanism for applying a friction member to a brake rotor, comprising means for rotating said shaft, a push-rod constituting said force transmitting member and adapted to apply a thrust to said friction member in response to rotation of said shaft.

5. The combination of claim 4, wherein said housing includes means defining a guide bore for said push-rod, said bore having a larger cross-section than said push-rod whereby said push-rod is capable of limited movement transversely of said bore to maintain rolling contact with said shaft upon rotation of said shaft.

References Cited

UNITED STATES PATENTS 1,530,227   3/1925   Bourassa _____ 74—107

FOREIGN PATENTS 747,972   4/1956   Great Britain.
171,424   5/1960   Sweden.

FRED C. MATTERN, JR., *Primary Examiner.*

J. D. SHOEMAKER, *Assistant Examiner.*

U.S. Cl. X.R.

188—73, 106